Dec. 22, 1936.  H. T. WOOLSON  2,065,004
FREEWHEELING TRANSMISSION
Filed Feb. 4, 1932   2 Sheets-Sheet 2
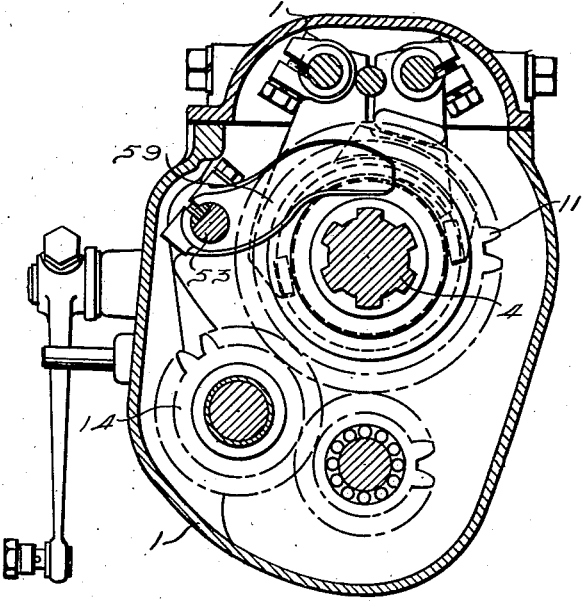
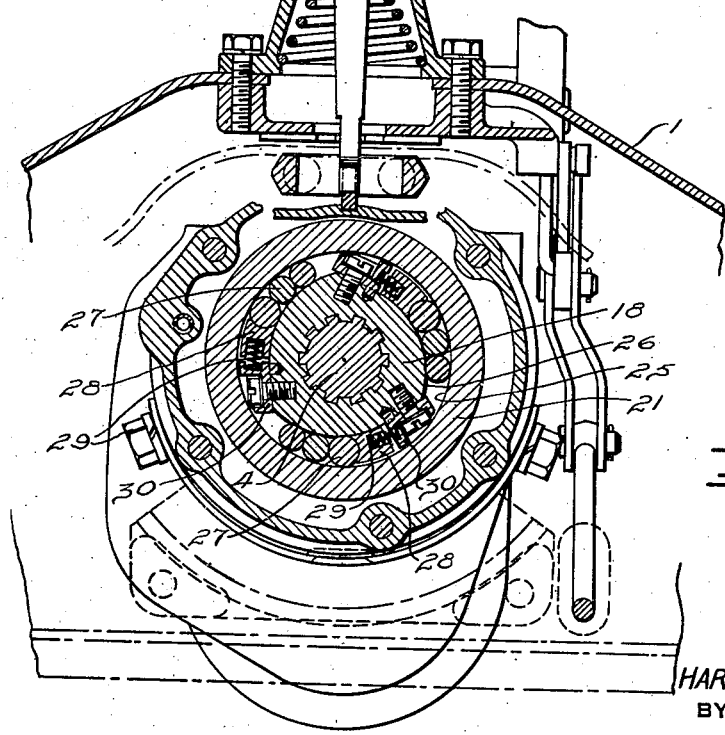
INVENTOR
HARRY T. WOOLSON.
BY
ATTORNEY Patented Dec. 22, 1936

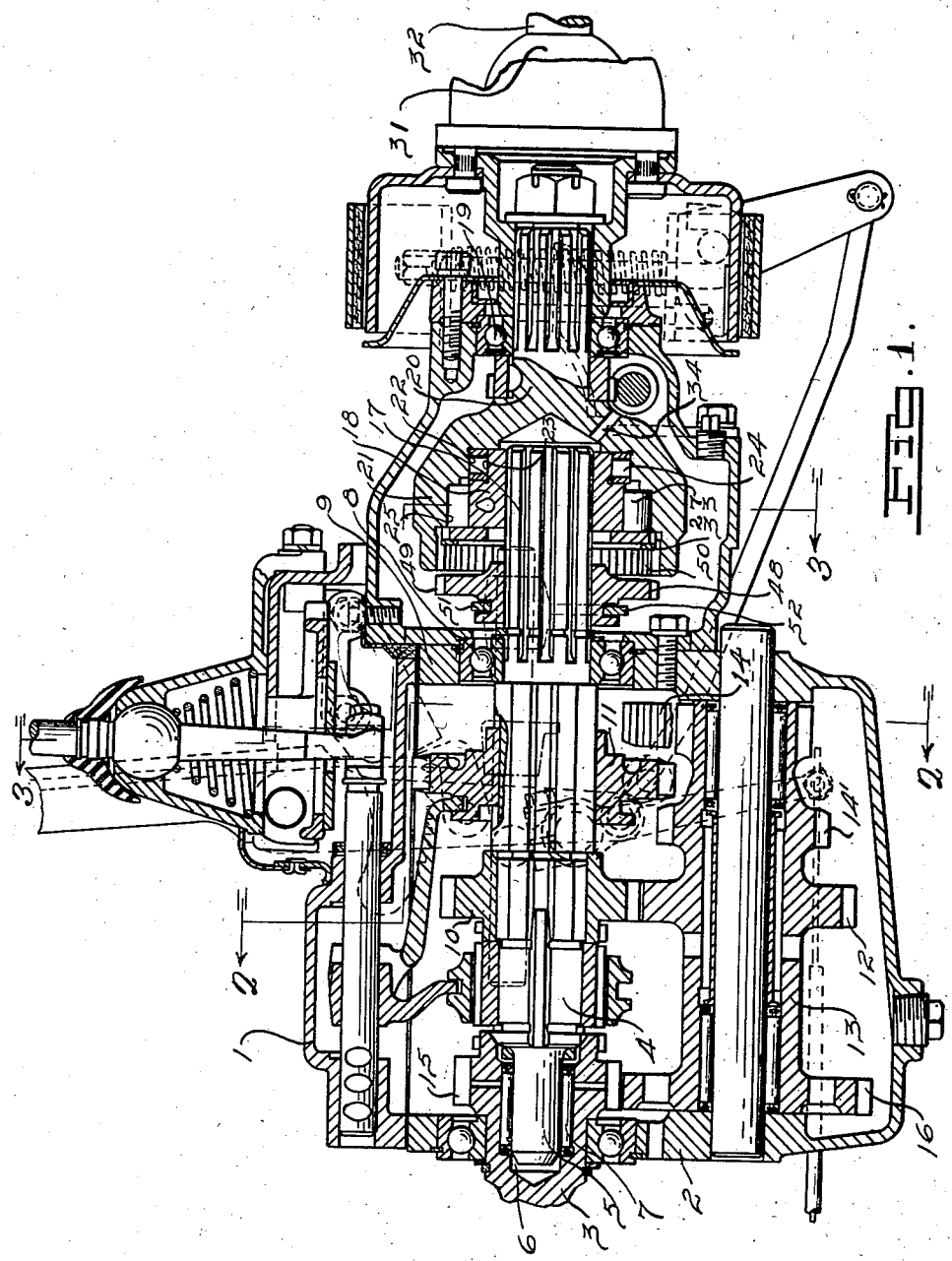

2,065,004

UNITED STATES PATENT OFFICE 2,065,004

FREEWHEELING TRANSMISSION

Harry T. Woolson, Detroit, Mich., assignor to Chrysler Corporation, Detroit, Mich., a corporation of Delaware Application February 4, 1932, Serial No. 590,877

2 Claims. (Cl. 192—113)

This invention relates to a vehicle transmission and particularly to an improved free wheeling unit.

The main objects of the invention are to provide in a vehicle transmission, a free wheeling unit of the type which has an outer hollow casing or drum and a relatively rotatable inner cam between which are provided rollers to hold the inner and outer members against relative rotation while the vehicle is being driven by its engine; to provide means for centering the drum with respect to the cam which are separated from the path in which the rollers travel so as to prevent removal of lubricant from the periphery of the drum with which the rollers cooperate; to provide a free wheeling unit in a vehicle transmission which has its inner cam member arranged to be driven by the engine and its outer drum positively connected with the propeller shaft thereof; to provide an engine driven inner cam member which promptly forces the rollers into binding engagement with the inner periphery of the drum against the retarding influence of thickened lubricant when the inner member is rotated; to provide a propeller shaft driven outer drum which rotates freely when the vehicle runs under its own momentum without carrying the rollers with it or urging them outwardly against the inner periphery of the drum by centrifugal force; and to provide a lubricant passage in a drum of this character which admits only that part of lubricant that has been thinned to a suitable viscosity to enter the free wheeling unit.

An illustrative embodiment of the invention is shown in the accompanying drawings, in which:

Fig. 1 is a substantially central vertical section of the transmission.

Fig. 2 is a transverse section taken on the line 2—2 of Fig. 1.

Fig. 3 is a transverse section taken on the line 3—3 of Fig. 1.

In the form shown, the improved free wheeling unit is illustrated in combination with a vehicle transmission of substantially conventional form which includes a housing 1 having a front end wall 2 in which is journaled a driven shaft 3 of a clutch (not shown). The final driven shaft 4 of the transmission has a reduced end section 5 which is received in an end recess 6 of the clutch shaft 3, and journaled therein by roller bearings 7. The rear end portion of the final driven shaft 4 is supported in ball bearings 8 which are carried by the wall 9 of the housing 1. Journaled upon that portion of the shaft lying between the reduced end 5 and the bearings 8 is a forward speed gear 10 which is meshed with the teeth 12 on a countershaft 13 and a reverse gear 11 splined on the shaft 4 may be meshed either with the teeth of a reverse pinion 14 or the teeth 14' of the countershaft. The countershaft is constantly driven in a conventional manner by meshed teeth 15 and 16 on the clutch shaft 3 and countershaft, respectively.

The final driven shaft 4 of the transmission has a rear section that protrudes beyond the bearings 8 that is provided with splines 17 and on which is non-rotatably fixed an inner cam member 18 of the free wheeling unit. Journaled in bearings 19 located in an opening in the rear end wall of the transmission housing 1 is a shaft 20 on which is integrally formed the outer driven element or drum 21 of the free wheeling unit. The drum 21 has an internal peripheral seat 22 which registers with a peripheral seat 23 on the cam member 18. A bearing 24 located between the peripheral seats 22 and 23, respectively, independently centers the drum 21 with respect to the cam 18 and maintains accurate concentricity between the drum and transmission shaft 4. The drum 21 also has an internal periphery 25 that is cylindrical in contour which surrounds and registers with the peripheral portion 26 of the cam member 18. As shown in Fig. 3, the cam member 18 has three intersecting peripheral sections which vary in distance from the axis of the shaft 4 and which converge with respect to the inner periphery 25 of the drum. The converging relation of the inner periphery 25 of the drum and the outer peripheral portion 26 of the cam provides arcuate-shaped chambers which have restricted non-adjacent ends and in which are disposed rollers 27.

The rollers 27 are yieldably urged toward the restricted ends of the chambers in which they are confined by blocks 28 that are yieldably urged in a clockwise direction by springs 29 bearing between the blocks and lugs 30 fixed to the periphery of the cam. The blocks 28 and lugs 30 are not relied upon to center the drum with respect to the cam, and therefore it is not necessary to have a rubbing action between their outer surfaces and the inner periphery of the drum. As a matter of fact, a substantial clearance is provided between the inner periphery 25 of the drum 21 and the outer surfaces of the blocks 28 and lugs 30 so as to prevent scraping of oil from the surfaces of the drum with which the rollers contact. From the construction shown in Fig. 3, it is evident that as the cam 18 is driven in a counterclockwise direction by the shaft 4 of the transmission to produce a forward drive, the rollers 27 become wedged between the drum and cam at the restricted ends of the chambers in which the rollers are confined, thus establishing a one-way drive between the cam and drum of the free wheeling unit.

The shaft 20 by which the drum 21 of the free wheeling unit is carried, is positively connected through a universal joint 31, or other flexible coupling, to the propeller shaft 32 which drives the rear wheels of the vehicle. When the vehicle is propelled by its own momentum, as for example during coasting with the engine operating at reduced speed and with the main clutch of the vehicle engaged, the drum 21 of the free wheeling unit is rotated by the propeller shaft in a counter-clockwise direction, as viewed in Fig. 3, relative to the cam member 18. This relative rotation of the cam and drum of the free wheeling unit moves the rollers away from the restricted ends of the chambers in which they are disposed against the action of the spring-pressed blocks 28 so as to permit substantially free rotation of the drum 21 relative to the cam 18, thereby establishing an over-running action which permits the vehicle to coast freely. Since the rollers 27 are revolved about the axis of the transmission shaft 4 at the rate at which the cam is rotated by the engine, these rollers are not urged outwardly by excessive force against the inner periphery 25 of the drum while the latter is rotating at a comparatively high speed during forward coasting of the vehicle. For this reason, it is unnecessary to provide the rollers with highly polished surfaces, which has heretofore been essential in order to avoid injury to the inner periphery of the drums of free wheeling units which have had their inner cam members driven by the propeller shaft during coasting of a vehicle.

When the speed of the transmission shaft 4 is increased to reestablish a driving relation between the road wheels and engine of a vehicle, the rollers 27, which are carried by the cam, are urged outwardly against the inner periphery 25 of the drum by centrifugal force which aids in promptly establishing a driving connection between the cam and drum. This useful application of the centrifugal force to which the rollers are subjected, is particularly advantageous during vehicle operation in cold weather when the lubricant becomes thick, for under these conditions the centrifugal force may be relied upon to assist in freeing the rollers when they have become bound together by lubricant.

The free wheeling unit is provided with a sealing ring 33 which bears against the front side face of the cam 18 and extends outwardly beyond the periphery 25 of the drum so as to completely seal the front open end of the compartment of the drum in which the rollers and cam are disposed against the admission of lubricant. A lubricant passage 34 provided in the rear end wall of the drum 21 is calibrated in size by predetermining its diameter to admit only that lubricant which is of suitable viscosity. In this manner, the forcing of thick and excessively viscous lubricant into the center of the drum by the movement of the parts of the transmission is avoided.

Since the cam 18 of the free wheeling unit is adapted to rotate freely in a reverse direction (clockwise as viewed in Fig. 3) relative to the drum 21, it is necessary to produce a two-way driving connection between the transmission and free wheeling unit during reverse driving. This is accomplished by a shiftable jaw clutch element 48 which is splined on the rear end portion of the transmission shaft 4 and which has peripheral teeth 49 that mesh with teeth 50 formed on the inner periphery of the drum 21. The jaw clutch element 48 has a hub portion which is provided with a groove 51 in which a fork 52 is received. The fork 52 is keyed on a bar 53 which is slidably mounted in the wall of the transmission housing 1. A fork 59, also keyed on the shaft 53, is located a short distance rearwardly of the gear 11 of the transmission. As the gear 11 is shifted rearwardly in the above manner to establish a reverse driving relation between the engine and the propeller shaft, it engages the fork 59 and shifts the latter, together with the bar 53 and the fork 52, rearwardly. This movement of the fork 52 forces the jaw clutch element 48 into meshed engagement with the teeth 50 of the drum 21 of the free wheeling unit, establishing an operative two-way driving connection between the drum of the free wheeling unit and the transmission shaft 4. When the gear 11 is moved forwardly from its reverse driving position to a neutral position, or beyond the neutral position to its low-speed driving position, a spring (not shown), acting through the shaft 53 and fork 52, shifts the jaw clutch element 48 forwardly to its inoperative position.

Although but one specific embodiment of the invention is herein shown and described, it will be understood that various changes in the size, shape, and arrangement of parts may be made without departing from the spirit of the invention, and it is not intended to limit its scope other than by the terms of the appended claims.

What I claim is:

1. In a vehicle transmission housing having lubricant therein, an over-running clutch including an outer casing having a cylindrical end recess and a communicating lubricant passage extending through its wall calibrated to admit only lubricant of a predetermined viscosity, a cam in said casing, said casing and cam having registering spaced converging peripheral portions, a plurality of rollers between said converging peripheral portions of said cam and casing for establishing a one-way driving connection between said cam and casing, and a closure for sealing the end recess of said casing against the admission of lubricant.

2. In a vehicle transmission housing having a lubricant therein, an over-running clutch including an outer member having a cylindrical end recess, an inner member, said members having registering spaced converging peripheral portions, a plurality of rollers between said bearing surfaces for establishing a driving connection between said members, means including a communicating passage for supplying lubricant to said clutch, and means sealing the end recess of said outer member against the admission of lubricant.

HARRY T. WOOLSON.